July 7, 1964 H. SICKEL ETAL 3,139,811
AIR DUCT VALVE FOR SHELTER
Filed Oct. 9, 1961 2 Sheets-Sheet 1
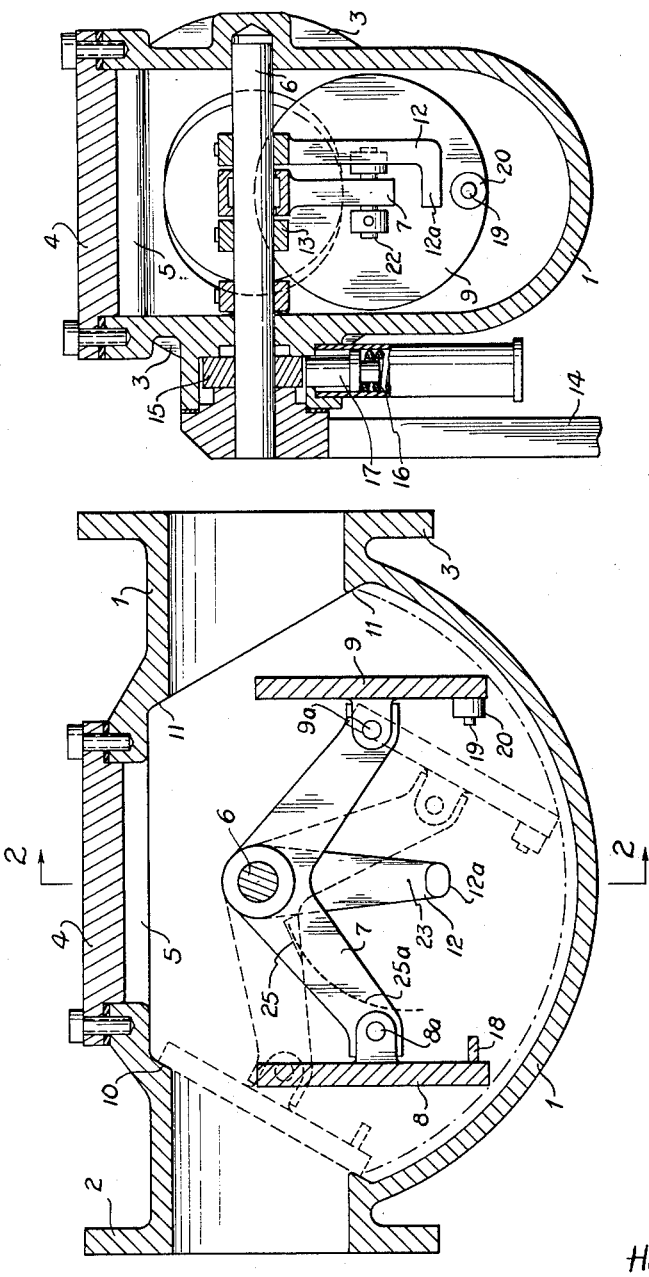
INVENTORS
Helmut Sickel
Paul Schierse
Günter Fianke
BY
Bailey, Stephens & Huettig
ATTORNEYS July 7, 1964 H. SICKEL ETAL 3,139,811
AIR DUCT VALVE FOR SHELTER
Filed Oct. 9, 1961 2 Sheets-Sheet 2

INVENTORS
Helmut Sickel
Paul Schierse
Günter Fianke
BY Bailey, Stephens & Huettig
ATTORNEYS

United States Patent Office 3,139,811
Patented July 7, 1964

3,139,811
AIR DUCT VALVE FOR SHELTER
Helmut Sickel, Cologne-Hohenberg, and Paul Schierse and Günter Fianke, Lubeck, Germany, assignors to Ewers & Miesner Hartgusswerk und Maschinenfabrik G.m.b.H., Lubeck, Germany
Filed Oct. 9, 1961, Ser. No. 143,804
Claims priority, application Germany Nov. 8, 1960
9 Claims. (Cl. 98—119)

This invention relates to an air duct valve. In particular, the invention is directed to an air shut-off valve for air raid shelters and the like.

The objects of the invention are to produce a valve having an increased speed of closure to enhance the security within the shelter during the times that there is a rise in the outside air pressure due to a bomb explosion and a following suction due to the drop of air pressure, and to produce a valve that offers little resistance to air flow during the normal open condition of the valve.

In general, these objects are obtained by this invention in having two valve heads mounted on a two-arm balance beam, as a scale balance beam, in order to obtain a speedy movement under the equal load conditions. The valve seat in the air inlet opening and air outlet opening in the valve is arranged so that one valve head closes upon a rise in the outside pressure and the other valve head closes during a drop in the outside pressure.

This balance beam mounting of the two valve heads has not only the advantage of a quick movement characteristic of a scale, which is desired for a quick closure under catastrophic conditions, while simultaneously functioning as a valve open under normal operating conditions and closable under super-atmospheric or sub-atmospheric pressure conditions, but also has the advantage in that the normal operating position of the valve heads gives little resistance to the flow of air through the valve while the heads can be quickly moved into completely closed position.

The valve of this invention is efficient for normal operation in which a first valve is used in the air intake duct and a second valve used in the air exhaust duct from the shelter. Because in conventional valves used for shelters to guard against explosive super and sub-pressures and conventional valves in exhaust ducts from the shelter that open when the shelter pressure is greater that atmospheric pressure, there is considerable resistance to the flow of air through the valve not only because of the constricted cross-section in the valve, but also because of the many sharp turns in the direction of the flow of the air, such requiring more power in the operation of the fresh air suction apparatus for the shelter, which is of considerable consequence when the pumps have to be operated manually when the electricity is shut off.

In this invention, the valve heads are carried by the balance beam so that in open position they do not obstruct a considerable part of the straightline flow of the air between the air inlet and the air outlet openings in the valves. This unobstructed cross-sectional area amounts to at least half of the cross-sectional area of the air passage. Another feature of this invention is that the upper edges of the valve heads do not extend beyond the center line through the valve. Therefore, there is little resistance to the flow of air through the valve. However, the valve heads are in a position so that they can be quickly closed during a sudden change in atmospheric pressure.

Another feature of this invention is in that, due to the balance beam mounting of the valve heads, it is possible to slightly over-weight one valve head so that, when the valve is inoperative, the unweighted valve head just about closes one valve opening, but an air pressure slightly greater than atmospheric pressure will counteract the over-weighted valve head and bring the valve heads into balanced normal operating open position. Thus this same valve construction also fulfills the function of a valve in the shelter air exhaust ducts for protection against greater than atmospheric pressure in the exhaust duct. This feature also applies to the valve used in the shelter air intake duct for protection against less than atmospheric pressure.

The means by which the objects of the invention are obtained are described more fully with reference to the accompanying drawings, in which:

FIGURE 1 is a longitudinal cross-sectional view through the valve of this invention;

FIGURE 2 is a cross-sectional view taken on the line 2—2 of FIGURE 1; and

Figure 3:
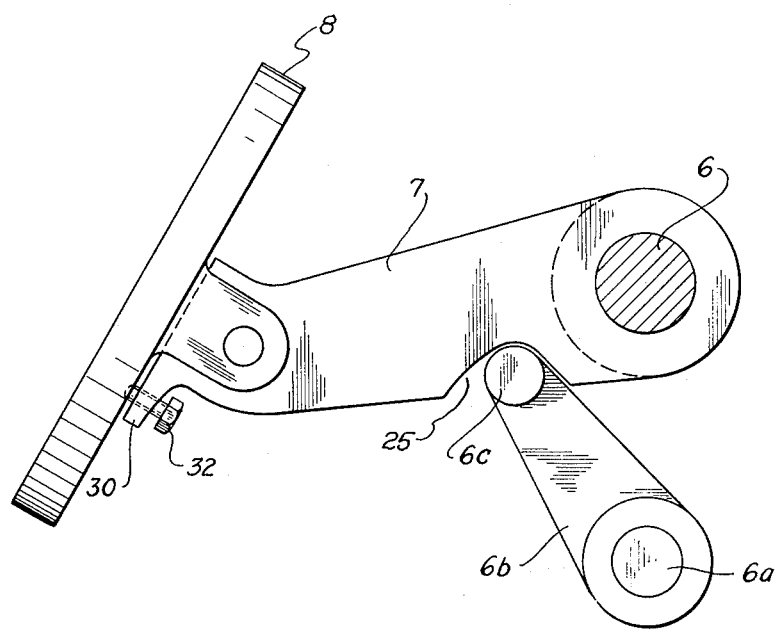
FIGURE 3 is an enlarged detail view of a modified construction.

As shown in FIGURES 1 and 2, the valve housing 1 has flanges 2 and 3 surrounding its air inlet and air outlet openings so that the valve can be inserted as a unit in an air duct. A removable cover 4 closes the access opening into the valve. A shaft 6 extends transversely through housing 1, the axis of shaft 6 lying in the plane of the center line through the valve. The double arm balance beam 7 is freely movably mounted on shaft 6 with a low frictional contact with shaft 6 as in a balance beam scale. Valve heads 8 and 9 are loosely joined to beam 7 by pins 8a and 9a, respectively, so that the valve heads are slightly movable with respect to the beam 7. This loose joint connection ensures a tight seating of the valve heads on the valve seats 10 and 11, respectively. A manually operable closure arm 12 is fixed to shaft 6 on one side of beam 7 while a locking ring 13 is fixed to shaft 6 on the other side of beam 7 so that beam 7 cannot move longitudinally of shaft 6. Arm 12 is actuated by a lever 14 joined to shaft 6 externally of housing 1. Upon the turning of lever 14, the end 12a of arm 12 moves either valve head 8 or 9 into closed position. As shown, the end 12a when moved will strike beam 7 to move the valve heads, but it can be arranged to directly strike either valve head 8 or 9. In order to hold the valve heads in closed position, a detent means 15 with a flattened surface is secured on shaft 6 and is held in place by means of the spring 16 urging plunger 17 against the flattened surface.

To over-weight one of the valve heads, each valve head 8 and 9 is provided with a threaded stem 18 and 19, respectively. When the valve is used in the exhaust duct for the shelter, a nut 20 is threaded on the stem 19 for the valve head 9 to over-weight the valve head. The weight of nut 20 is such as to bring it to the valve head 8 in closed position. However, the normally higher than atmospheric air pressure within the shelter is sufficient to move the valve heads back into the balanced vertical position as shown in FIGURE 1, with the valve heads at rest in that position. There are two separate and independent air ducts for each shelter. One is the fresh air intake duct, and the other is the shelter air exhaust duct. Therefore, two valve housings 1 are used, the first in the intake duct and the second in the exhaust duct. When the valve is used in the air exhaust duct for the shelter, the nut 20 is threaded onto stem 18 for valve 8 so that, when not in operation, valve head 9 is closed, but in operation, the normal suction of the exhaust air flow through the valve will bring both valve heads 8 and 9 into balanced vertical position. The sudden air pressure resulting from an explosion will act simultaneously upon the first valve housing in the air intake duct into the shelter and on the second valve housing in the air exhaust duct from the shelter. Both the first air intake valve and the second air exhaust valve for the shelter will be closed at the same time. In each valve, the valve head closures will be reversed by the suction which follows the explosion.

As shown in FIGURE 3, a separate closure shaft and arm can be substituted for the arm 12 in FIGURE 1. This shaft is mounted transversely through the housing 1 at the point 23 in FIGURE 1, the shaft being connected to a lever 14. Closure shaft 6a is fixed to an arm 6b, the free end 6c of which is adapted to come to rest in a notch 25 formed in the edge of beam 7. Thus the free end 6c will follow the curve 25a indicated on FIGURE 1. The valve head is thereupon locked into closed position and thus avoids the need for using the detent means 15 shown in FIGURE 2. When using the separate quick closure shaft 6a, the balance beam 7 can be fixed to shaft 6 and the shaft 6, in turn, journalled in housing 1 with anti-friction bearings. This invention also has the advantage in fulfilling all the requirements for reliable operation and protection required for a valve used under both greater than and sub-atmospheric pressures. The valve is secure and safe against pressure and suction waves, can be mechanically quickly closed, and is of inexpensive construction requiring little space.

As further shown in FIGURE 3, a stop is provided for holding the valve head in position so that it will not jam against the valve seat, especially during a manually quick closure. To this end, the end of beam 7 is provided with a flange 30 having a threaded opening through which is threaded a bolt 32, the free end of which bears against valve head 8, thus providing a stop for the valve.

Having now described the means by which the objects of the invention are obtained, we claim:

1. An air duct valve for a shelter comprising a symmetrical housing having two flanged open couplings in horizontal center line alignment with one another for inserting said housing into an air duct, and thus providing a straight-line air passage through said housing, two valve seats, one toward and one away from the shelter, respectively, positioned across said center line with each seat being located at the transition from said housing to one of said couplings, a shaft mounted in the central vertical plane of and horizontally transversing said housing and said air passage, a beam of balance pivotally supported at its center point on said shaft, said beam being bent so that its ends lie below the center line of said passageway, two valve heads, means for pivotally supporting said valve heads, respectively, in oppositely facing directions on each end, respectively, of said beam of balance, said beam of balance and said valve heads constituting a tiltable valve head device normally resting in balanced open position with said valve heads substantially vertical with respect to said straight-line air passage and partially projecting into said passage, said tiltable valve head device, upon an air blast striking the front face of one valve head as well as the rear side of the other valve head, being movable by said air blast in a direction whereby one valve head closes said air passage upon being seated on the valve seat toward the shelter, and said tiltable valve head device also being movable in the opposite direction by the suction following the air blast to seat said other valve head on the valve seat away from the shelter and thus protecting the shelter against shock waves resulting from a detonation.

2. An air duct valve as in claim 1, each of said valve heads being positioned on said beam of balance, when in its balanced position, to leave open at least one-half of the air duct valve's cross-section for a straight air flow therethrough.

3. An air duct valve as in claim 1, the upper edge of each of said valve heads not extending above the longitudinal center line through said air passage as long as said beam of balance maintains its balanced open position.

4. An air duct valve as in claim 1, further comprising an overweight member secured to said outermost valve head to counteract the air pressure of the normal operative outward air flow upon said valve heads and thus hold the valve heads balanced in open position during normal operating conditions while upon stoppage of said outward air flow, said overweight member causes a tilting of said valve head device and the closing of said innermost valve head against its seat to automatically protect the shelter against the entry of possibly contaminated air.

5. An air duct valve as in claim 1, each valve head being loosely pivotally joined to said beam of balance for limited movement with respect thereto.

6. An air duct valve as in claim 1, further comprising a manually operable lever secured to said shaft exteriorly of said housing, a closure arm secured to said shaft within said housing and extending away from said shaft between said valve heads for contacting and moving said beam of balance, and a notch on said beam of balance adjacent said shaft for receiving said closure arm, when actuated by said lever, and thereby locking said innermost valve head in closed position.

7. An air duct valve as in claim 6, further comprising spring-pressed detent means contacting said shaft for holding a valve head in closed position.

8. An air duct valve as in claim 6, said beam of balance being restrained against lateral displacement along said shaft by said closure arm on one side and by a locking ring fixed to said shaft on the other side of said beam of balance.

9. An air duct valve as in claim 1, further comprising a second shaft mounted in said housing, a manually operable lever secured to said second shaft exteriorly of said housing, a closure arm secured to said second shaft, and a notch on said beam of balance for receiving said closure arm when actuated by said lever to lock said innermost valve head in closed position.

References Cited in the file of this patent

UNITED STATES PATENTS

| | | |
|---|---|---|
| 1,919,602 | Stewart | July 23, 1933 |
| 2,017,033 | McGuffin | Oct. 8, 1935 |
| 2,265,595 | Carlson | Dec. 9, 1941 |
| 2,578,590 | Perrault | Dec. 11, 1951 |
| 2,785,622 | Carrick | Mar. 19, 1957 |